(12) United States Patent
Long et al.

(10) Patent No.: US 7,810,776 B2
(45) Date of Patent: Oct. 12, 2010

(54) ADJUSTABLE MECHANISM

(75) Inventors: Ben-Gui Long, Shenzhen (CN); Xiang-Dong Ruan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/431,868

(22) Filed: Apr. 29, 2009

(65) Prior Publication Data

US 2010/0108833 A1    May 6, 2010

(30) Foreign Application Priority Data

Oct. 31, 2008    (CN) .................... 2008 1 0305334

(51) Int. Cl.
  *A47B 91/00*    (2006.01)
  *A47G 29/00*    (2006.01)
  *B65D 19/00*    (2006.01)

(52) U.S. Cl. .................... 248/346.03; 248/176.1; 248/346.01; 248/917

(58) Field of Classification Search .......... 248/176.1, 248/346.01, 346.03, 917, 918, 233.41, 224.7, 248/220.21, 222.12, 314
See application file for complete search history.

(56) References Cited

U.S. PATENT DOCUMENTS

| 6,082,688 | A  | * | 7/2000 | Wilson | 248/222.11 |
| 7,101,109 | B2 | * | 9/2006 | Huang et al. | 403/315 |
| 7,274,556 | B2 | * | 9/2007 | Chung | 361/679.27 |
| 2007/0001084 | A1 | * | 1/2007 | Jung et al. | 248/676 |

* cited by examiner

*Primary Examiner*—Amy J Sterling
(74) *Attorney, Agent, or Firm*—Clifford O. Chi

(57) ABSTRACT

An adjustable mechanism includes a first bottom plate, a second bottom plate, a receiving block positioned, a receiving block, and an elastic member. The receiving block is positioned between the first bottom plate and the second bottom plate. The receiving block defines a receiving cavity. The connecting member includes an inserted portion. The inserted portion defines a latching groove therein. The elastic member includes an elastic protrusion. The inserted portion and the elastic member are received in the receiving cavity in such manner that the elastic protrusion is received in the latching groove.

19 Claims, 4 Drawing Sheets

ADJUSTABLE MECHANISM

BACKGROUND

1. Technical Field

The present disclosure relates to adjustable mechanisms, and particularly to an adjustable mechanism employed in a flat-panel display.

2. Description of the Related Art

A display adjustable mechanism generally includes a supporting module, a hinge assembly, and a slidable module. The hinge assembly connects the adjustable assembly to the supporting module. A display is fixed on the slidable module, thus a rotatable angle range of the display and a distance from the display to a table, that the display stands, can be adjusted.

The supporting module generally includes a base and a frame. When the display is needed to be carried from a place to another place, the frame is detached from the base.

However, to detach the frame from the base, latching sheets need to be pressed. This can be troublesome. Additionally, the latching sheets may be easily abraded because the mechanical strength of the latching sheets is relatively weak. Therefore, a service life of the hinge assembly is shortened.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
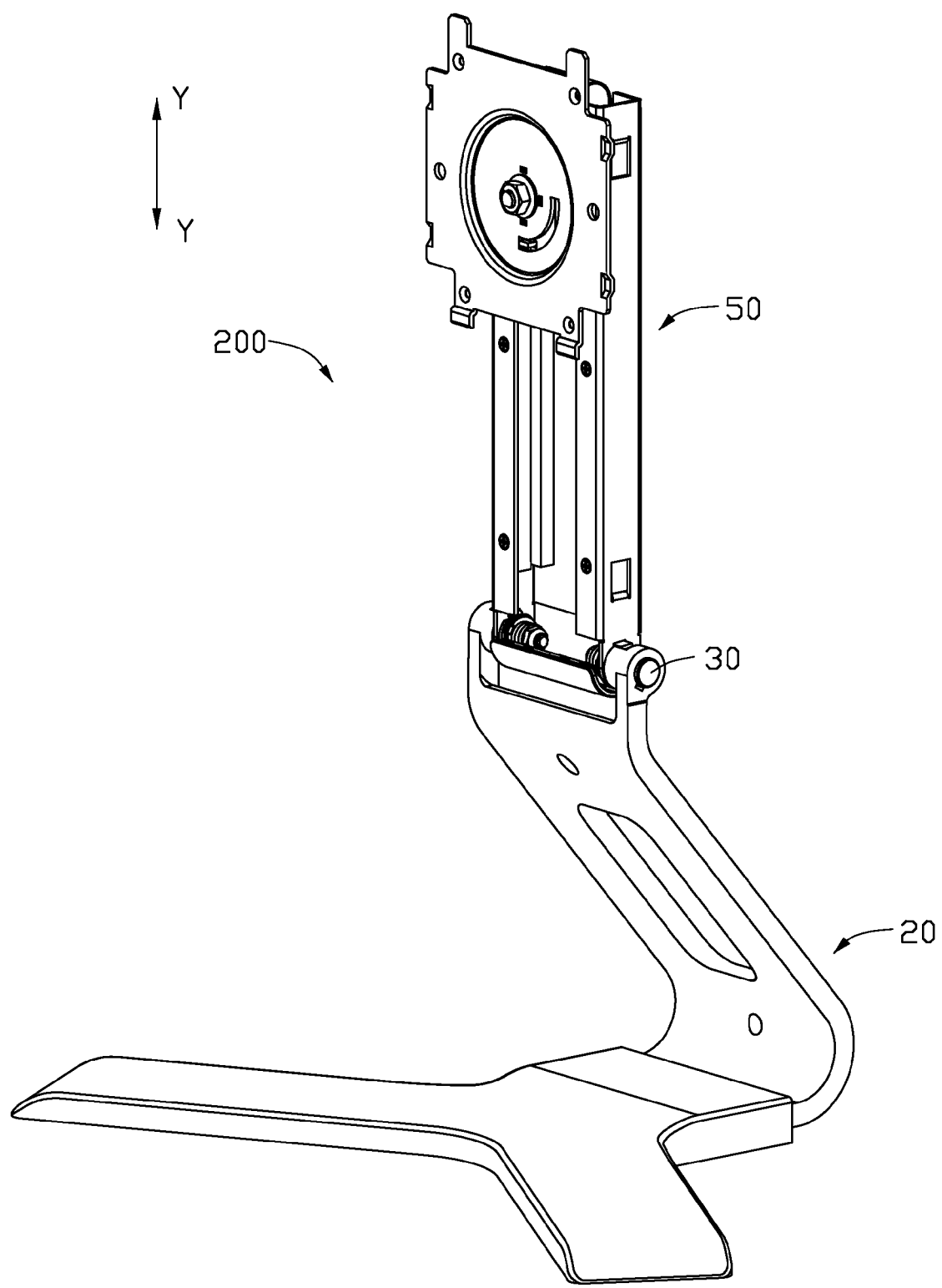
FIG. 1 is an isometric view of an embodiment of an adjustable mechanism including a supporting module and a slidable module.

FIG. 1 shows an exemplary adjustable mechanism 200 that may be employed with a flat-panel display (not shown) such as a liquid crystal display. The adjustable mechanism 200 includes a supporting module 20, a hinge assembly 30, and a slidable module 50.

Figure 2:
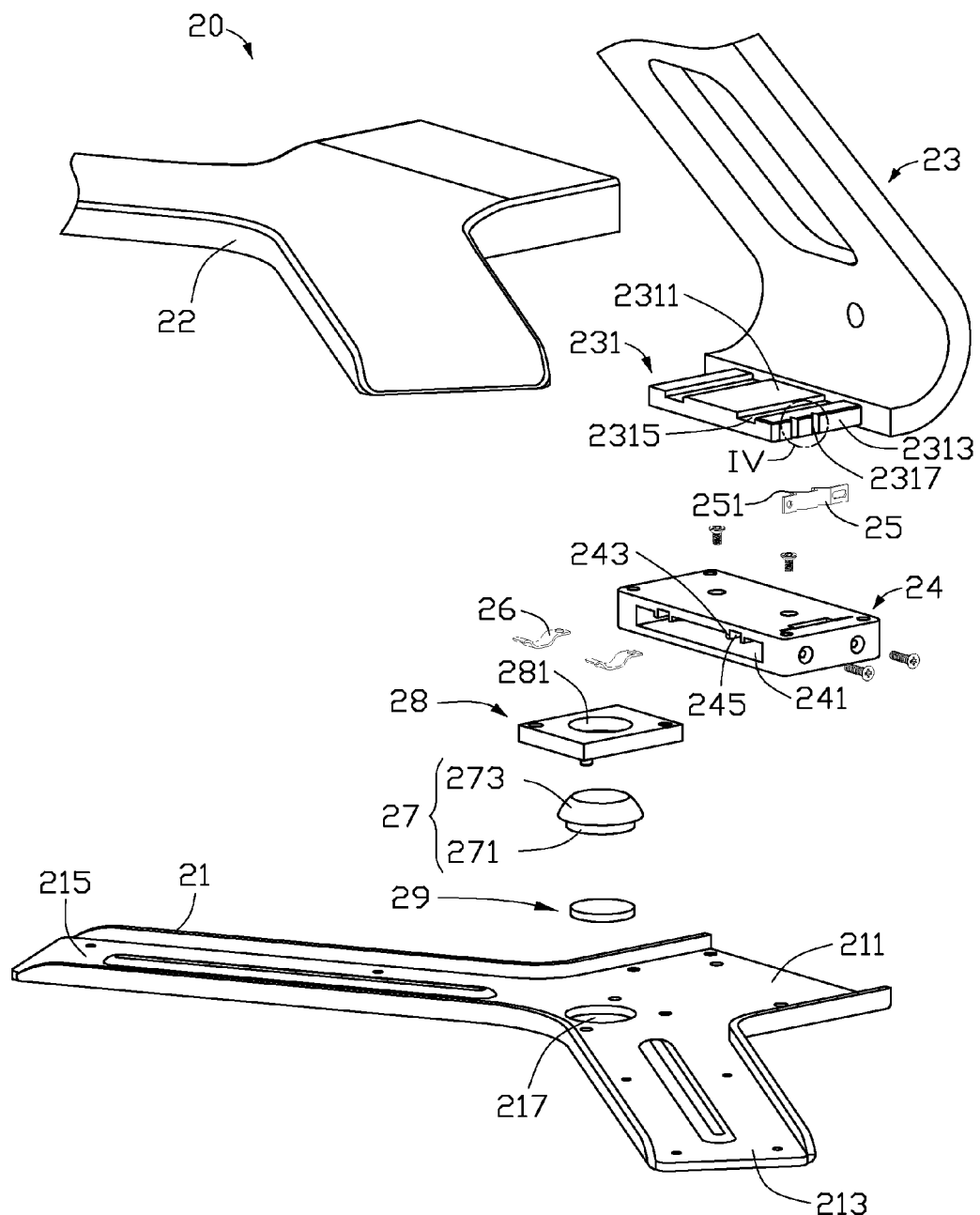
FIG. 2 is an exploded, isometric view of the supporting module of the adjustable mechanism in FIG. 1.

FIG. 2 shows that the supporting module 20 includes a first bottom plate 21, a second bottom plate 22, a connecting member 23, a receiving block 24, a first resilient member 25, two second resilient members 26, a rotatable base 27, a protecting cover 28, and a washer 29 made of silicone rubber.

The first bottom plate 21 includes a main portion 211, a first branch portion 213, and a second branch portion 215. The first branch portion 213 and the second branch portion 215 each angularly extend from the main portion 211. The first bottom plate 21 defines a through hole 217 in the main portion 211. The through hole 217 is configured to receive the rotatable base 27.

A shape of the second bottom plate 22 corresponds to the shape of the first bottom plate 21 such that the first bottom plate 21 and the second bottom plate 22 define a receiving space therebetween (not shown) when the second bottom plate 22 engages with and over the first bottom plate 21.

Figure 4:
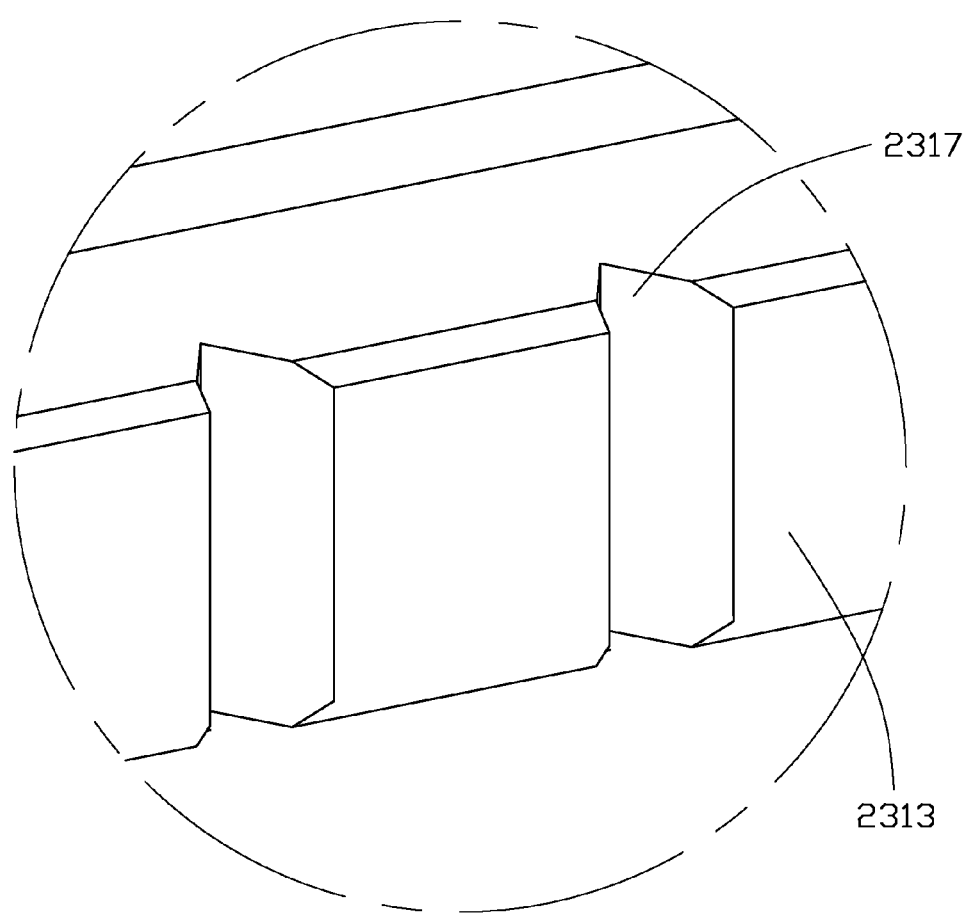
FIG. 4 is an enlarged view of a circled portion IV of FIG. 2.

The connecting member 23 is curved. A first end of the connecting member 23 is configured to engage with the hinge assembly 30, and a second end of the connecting member 23 forms an inserted portion 231. The inserted portion 231 is substantially rectangular and includes a top surface 2311 and a side surface 2313 substantially perpendicular to the top surface 2311. The inserted portion 231 defines two guiding grooves 2315 in the top surface 2311 and two latching grooves 2317 in the side surface 2313. The latching grooves 2317 are substantially V-shaped, as seen in FIG. 4. An extending direction of the latching grooves 2317 is substantially perpendicular to the inserted portion 231 and the guiding grooves 2315.

The receiving block 24 is substantially rectangular and defines a receiving cavity 241 to receive the inserted portion 231. A sidewall of the receiving cavity 241 forms two pairs of elongated protrusions 243. Each pair of elongated protrusions 243 defines a receiving slot 245.

The first and second resilient members 25, 26 are curved elastic sheets. Each elastic member 25 includes two ridge-shaped protrusions 251. The ridge-shaped protrusions 251 can be inserted into the latching grooves 2317.

The rotatable base 27 includes a shaft portion 271 and a flange portion 273 on an end of the shaft portion 271.

The protecting cover 28 defines a through hole 281 to receive a portion of the flange portion 273.

Figure 3:
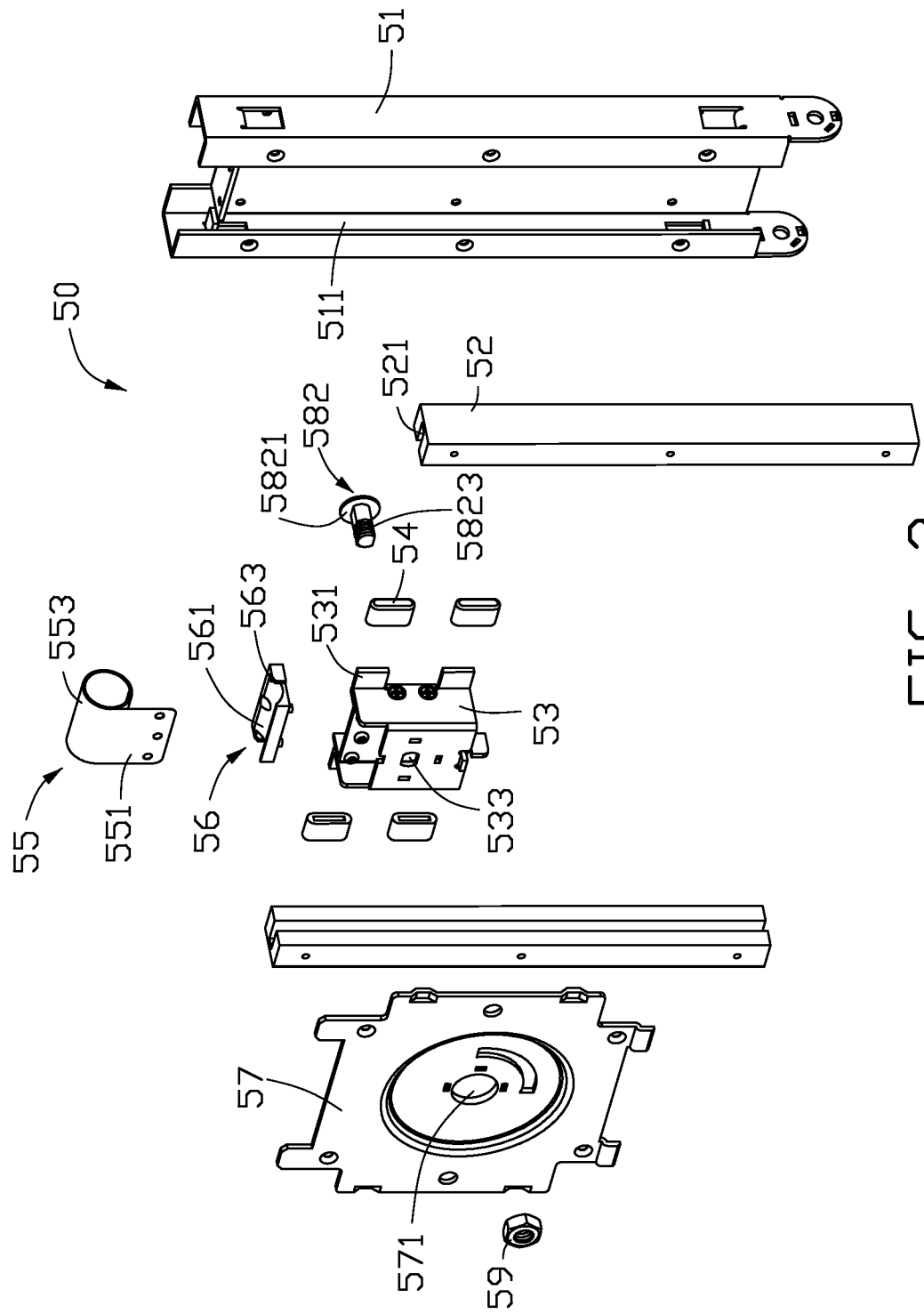
FIG. 3 is an exploded, isometric view of the slidable module of the adjustable mechanism in FIG. 1.

Referring to FIG. 3, the slidable module 50 includes a frame 51, two sliding rails 52, a sliding member 53, a plurality of protecting sleeves 54, a coiled spring 55, a holder 56, a fixing plate 57, a pivotal shaft 582, and a nut 59.

The frame 51 is elongated and forms two opposite side portions 511.

Each rail 52 is elongated and defines a guiding groove 521. To reduce friction forces between the sliding member 53 and the sliding rails 52, the rails 52 may be made of a low-friction material, such as polyoxymethylene (POM).

The sliding member 53 is substantially rectangular. The sliding member 53 defines four sliding portions 531 for engaging the guiding grooves 521. The sliding member 53 defines a non-circular fixing hole 533. The sliding portions 531 are made of metal to have a strong mechanical strength.

The protecting sleeves 54 may be made of metal and sleeved over the sliding portions 531 to protect the sliding portions 531 from abrasion. The protecting sleeves 54 may be omitted.

The coiled spring 55 includes a first end 551 and a second end 553. The second end 553 is curved.

The holder 56 defines a curved groove 561 and forms a hook 563. The curved groove 561 is configured to receive the second end 553 of the coiled spring 55.

The fixing plate 57 defines a circular through hole 571 in a center of the fixing plate 57.

The pivotal shaft 582 includes a flange portion 5821 and a shaft portion 5823 extending from a side of the flange portion 5821. The shaft portion 5823 is flat along a section of a cylindrical surface, thus forming a flat surface (not labeled). An end, away from the flange portion 5821, of the shaft portion 5823 forms a thread portion (not labeled).

To assemble the adjustable mechanism 200, the shaft portion 271 is passed through the through hole 217, then the protecting cover 28 is fixed on the first bottom plate 21 such that the flange portion 273 is received in the through hole 281. After that, the washer 29 is adhered on the end of the shaft portion 271. As a result, the rotatable base 27 is rotatably positioned on the first bottom plate 21.

The resilient members 26 are received in the receiving slots 245, the elastic member 25 is fixed on a side wall of the receiving cavity 241 by screws (not labeled). The receiving block 24 is then fixed on the first bottom plate 21 by screws (not labeled).

The second bottom plate 22 is fixed on the first bottom plate 21 to cover the receiving block 24 and the protecting cover 28.

The inserted portion 231 is inserted into the receiving cavity 241 in such manner that the resilient members 26 abuts bottoms of the guiding grooves 2315 and the ridge-shaped protrusions 251 are latched in the latching groove 2317, thus the inserted portions 2110 are locked in the receiving cavity 241. Since the ridge-shaped protrusions 251 are resilient and resist the side wall of the latching groove 2317, the inserted portion 231 can be firmly fixed in the receiving cavity 241.

The sliding rails 52 are fixed on the side portions 511, the protecting sleeves 54 are sleeved on the sliding portions 531. The thread portion of the pivotal shaft 582 is passed through the through hole 533 and then the through hole 571, and engages with the nut 59. As a result, the fixing plate 57 is rotatably positioned on the sliding member 53.

The holder 56 is fixed on an end of the frame 51, the second end 553 of the coiled spring 55 is received in the curved groove 561 of the holder 56 such that the second end 553 is fixed on the frame 51, the hook 563 limits the coiled spring 55 such that the coiled spring 55 can slide along a side wall of the curved groove 561, without detaching from the holder 56. The first end 551 of the coiled spring 55 is fixed on the sliding member 53, and the protecting sleeves 54 are sleeved on the sliding portions 531 and received in the guiding grooves 521 correspondingly. As a result the display (not shown) can be fixed on the fixing plate 57 such that the sliding member 53 may drive the fixing plate 57 to slide along the guiding grooves 521, to facilitate a downward or upward movement of the display.

The hinge assembly 30 rotatably connects the frame 51 to the connecting member 23 such that the slidable module 50 is rotatable relative to the supporting module 20.

Generally, when the display employing the adjustable mechanism 200 is placed on a table, a pull force of the coiled spring 55 on the sliding member 53 is substantially equal to a frictional force between the protecting sleeves 54 and the guiding grooves 521, thus the display can be maintained at a desired position in a vertical direction Y-Y.

To adjust the display along the vertical direction Y-Y, the display is moved upwards or downwards, driving the sliding member 53 to slide, simultaneously, the second end 553 of the coiled spring 55 will extend or contract with a movement of the sliding member 53.

After the display reaches a desired position in the vertical direction Y-Y and the external force is released, the display is maintained at the desired position in the vertical direction Y-Y again.

Because the hinge assembly 30 rotatably connects the slidable module 50 to the supporting module 20, the slidable module 50 is rotatable relative to the supporting module 20, thus an inclination of the display can be adjusted.

To detach the connecting member 23, an external force is applied on the connecting member 23, the elastic member 25 is deformed and the connecting member 23 is detached from the receiving block 24.

In addition, because the ridge-shaped protrusions 251 are formed by bending the elastic member 25, when the ridge-shaped protrusions 251 are damaged, the damaged elastic member 25 may be replaced by a new one, thus, a maintenance/repair cost is reduced.

It should be pointed out, when the display stands on a table, the washer 29 touches the table and deforms, thereby increasing a frictional force between the adjustable mechanism xx and the table to prevent the display sliding relative to the table.

It can be understood that, the ridge-shaped protrusions 251 may be hemispherical, and the latching groove 2317 should be hemispherical correspondingly. It can be understood that, the second bottom plate 22 may be integrally formed with the first bottom plate 21.

It can be understood that, the receiving block 24 may be integrally formed with the first bottom plate 21 and the second bottom plate 22.

It can be understood that, the latching grooves 2317 may be omitted.

Finally, while various embodiments have been described and illustrated, the embodiments are not to be construed as being limited thereto. Various modifications can be made to the embodiments by those skilled in the art without departing from the true spirit and scope of the embodiments as defined by the appended claims.

What is claimed is:

1. An adjustable mechanism comprising:
   a first bottom plate;
   a second bottom plate;
   a receiving block positioned between the first bottom plate and the second bottom plate, the receiving block defining a receiving cavity therein;
   a connecting member comprising an inserted portion being substantially rectangular and comprising a side surface and a latching groove defined in the side surface; and
   an elastic member comprising an elastic protrusion, wherein the inserted portion and the elastic member are received in the receiving cavity in such manner that the elastic protrusion is received in the latching groove.

2. The adjustable mechanism of claim 1, wherein the elastic protrusion is ridge-shaped, and the latching groove is substantially V-shaped.

3. The adjustable mechanism of claim 1, wherein the ridge-shaped protrusions are formed by bending the elastic member.

4. The adjustable mechanism of claim 1, further comprising a resilient member, wherein the inserted portion comprises a top surface connecting the side surface and defines a guiding groove in the top surface, and the resilient member is fixed on a side wall of the receiving cavity and is received in the guiding groove.

5. The adjustable mechanism of claim 4, wherein an extending direction of the latching groove is substantially perpendicular to that of the inserted portion.

6. The adjustable mechanism of claim 5, wherein the extending direction of the latching groove is substantially perpendicular to that of the guiding groove.

7. The adjustable mechanism of claim 4, wherein the side wall of the receiving cavity defines a receiving slot to receive the resilient member.

8. The adjustable mechanism of claim 1, further comprising a frame, two sliding rails, a sliding member, and a coiled spring; wherein the frame is positioned on the connecting member; the sliding rails are fixed on the frame; the sliding member is slidably positioned on the sliding rails; a first end of the coiled spring is fixed on the frame, and a second end opposite to the first end of coiled spring is fixed on the sliding member.

9. The adjustable mechanism of claim 8, wherein each sliding rail defines a guiding groove, the sliding member forms a plurality of sliding portions to engage with the guiding grooves such that the sliding member is slidably positioned on the sliding rails.

10. The adjustable mechanism of claim 8, wherein the sliding rails are made of polyoxymethylene.

11. The adjustable mechanism of claim 8, wherein the sliding portions are made of metal.

12. The adjustable mechanism of claim 8, further comprising a fixing plate, a pivotal shaft, and a nut, the pivotal shaft is passed through the sliding member and the fixing plate, and engages with the nut.

13. The adjustable mechanism of claim 8, further comprising a hinge assembly, wherein the hinge assembly rotatably connects the frame to the connecting member.

14. The adjustable mechanism of claim 8, further comprising a holder, wherein the holder defines a curved groove, the holder is fixed on the frame, and the first end of the coiled spring is received in the curved groove.

15. The adjustable mechanism of claim 14, wherein the holder forms a hook, and the hook limits the coiled spring.

16. The adjustable mechanism of claim 1, further comprising a washer, wherein the washer is made of silicone and positioned on the first bottom plate.

17. The adjustable mechanism of claim 16, further comprising a rotatable base, wherein the rotatable base comprises a shaft portion and a flange portion formed on an end of the shaft portion, the first bottom plate defines a through hole, the shaft portion is passed through the through hole of the first bottom plate, and the washer is positioned on the end of the shaft portion.

18. The adjustable mechanism of claim 17, further comprising a protecting cover, wherein the protecting cover defines a through hole; the protecting cover is fixed on the first bottom plate such that the flange portion is received in the through hole of the protecting cover.

19. An adjustable mechanism comprising:
a first bottom plate;
a second bottom plate;
a receiving block positioned between the first bottom plate and the second bottom plate, the receiving block defining a receiving cavity therein;
a connecting member comprising an inserted portion and the inserted portion defining a latching groove therein;
an elastic member comprising an elastic protrusion, wherein the inserted portion and the elastic member are received in the receiving cavity in such manner that the elastic protrusion is received in the latching groove;
a frame positioned on the connecting member;
two sliding rails fixed on the frame;
a sliding member slidably positioned on the sliding rails; and
a coiled spring having a first end fixed on the frame and a second end opposite to the first end fixed on the sliding member.

* * * * *